Patented Apr. 27, 1926.

1,582,860

UNITED STATES PATENT OFFICE.

ANTON EDUARD van ARKEL AND JAN HENDRIK de BOER, OF EINDHOVEN, NETHERLANDS, ASSIGNORS TO N. V. PHILIPS' GLOEILAMPENFABRIEKEN, OF EINDHOVEN.

PROCESS OF SEPARATING HAFNIUM AND ZIRCONIUM.

No Drawing.　　Application filed August 5, 1924.　Serial No. 730,300.

*To all whom it may concern:*

Be it known that we, ANTON EDUARD VAN ARKEL and JAN HENDRIK DE BOER, both subjects of the Queen of the Netherlands, residing at Eindhoven, in the Province of North Brabant, in the Kingdom of the Netherlands, have invented certain new and useful Improvements in or Relating to a Process of Separating Hafnium and Zirconium, of which the following is a specification.

This invention comprises a process of separating a mixture of zirconium- and hafnium compounds, and more particularly of zirconium- and hafnium halogenides.

Zirconium and hafnium or their compounds are very similar from a chemical point of view and consequently there are certain difficulties in their separation.

As a rule the separation of a mixture of two components may be ensured rather easily, if it is possible for the mixture to be made liquid at atmospheric pressure and to be subjected subsequently to fractional distillation.

In view of a successful separation it is furthermore important that the vapour and liquid curves should not be too nearly identical.

Now it has been found that it is not possible to simply bring a mixture of zirconium and hafnium-halogenides into a liquid state. Thus, for example, a mixture of zirconium and hafnium chloride has the characteristic that it cannot fuse at atmospheric pressure, and by heat is entirely transformed into vapour.

According to the invention the separation of a mixture of zirconium and hafnium halogenides is obtained by adding a certain quantity of one or more of the halogenides of the elements of the fifth and sixth groups of the periodic system to the mixture, whereupon the mixture thus produced is separated by fractional distillation.

The elements of the fifth and the sixth group of the periodic system are known to be the elements, the highest valence numeral of which is 5 or 6, such for example as phosphorus, arsenic, antimony or molybdenum, tungsten.

According to the invention a certain quantity of phosphorus pentachloride can be added to a mixture of zirconium and hafnium chloride, whereupon the separation of the mixture thus produced is ensured by means of fractional distillation.

The following is an example of carrying out the process according to the invention.

Two parts of the mixture of zirconium and hafnium chloride and one part of phosphorus pentachloride are mixed together. This mixture contains an excess of phosphorus pentachloride, serving to convert any zirconium oxide or oxychloride (hafnium oxide or oxychloride) which may have been formed, into zirconium chloride (hafnium chloride).

At about 200° C. the mass is melted, whereby compounds are formed between $PCl_5$ and $POCl_3$ on the one hand and the zirconium and hafnium chlorides on the other hand; at this temperature a little $PCl_5$, $POCl_3$ and if present volatile impurities such as titanium chloride, are already distilled over. Between 230° C. and 360° C. a fraction rich in hafnium is distilled over, whereas a zirconium compound with $POCl_3$ is not distilled over until 360° C., and a zirconium compound with $PCl_5$ is not distilled over until 410° C.

The fraction which is rich in zirconium or in hafnium may be subjected to a further fractional distillation and this process may be continued until a mixture containing the desired high proportion of zirconium or the desired high proportion of hafnium is obtained.

By treating the zirconium and hafnium compounds produced with water, the phosphate which is very difficultly worked up is produced. However, on treating the zirconium and hafnium compounds with a base the zirconium oxide or the hafnium oxide is formed, and these oxides may serve as starting material for other desired zirconium or hafnium compounds.

What we claim is:

1. A process for separating a mixture of zirconium and hafnium halogenides, characterized in that at least one of the halogenides of the elements of the fifth and sixth group of the periodic system is added to the mixture, whereupon the separation of the mixture thus produced is obtained by fractional distillation.

2. A process for separating a mixture of zirconium- and hafnium chlorides according to claim 1, characterized in that phosphorus pentachloride is added to the mixture, whereupon the separation of the mixture thus produced is obtained by fractional distillation.

In testimony whereof we affix our signatures, at the city of Eindhoven, this 10th day of July, 1924.

ANTON EDUARD van ARKEL.
JAN HENDRIK de BOER.